US007760805B2

(12) United States Patent  
Owens (10) Patent No.: US 7,760,805 B2  
(45) Date of Patent: Jul. 20, 2010

(54) METHOD OF ENHANCING IMAGES EXTRACTED FROM VIDEO

(75) Inventor: James Owens, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1450 days.

(21) Appl. No.: 11/142,084

(22) Filed: May 31, 2005

(65) Prior Publication Data

US 2006/0268981 A1    Nov. 30, 2006

(51) Int. Cl.
*H04N 7/12* (2006.01)
*G06K 9/40* (2006.01)

(52) U.S. Cl. .................. 375/240.12; 382/269
(58) Field of Classification Search ............ 375/240.12, 375/240.13, 240.29, 240.02, 240.27; 382/269, 382/274, 275, 236
See application file for complete search history.

(56) References Cited

U.S. PATENT DOCUMENTS

| 5,987,179 | A  | * | 11/1999 | Riek et al. ............... 382/236 |
| 6,862,372 | B2 |   | 3/2005 | Yang et al. |
| 7,075,993 | B2 | * | 7/2006 | O'Brien, Jr. ............ 375/240.27 |
| 7,359,439 | B1 | * | 4/2008 | Conover ................. 375/240.12 |
| 2005/0078872 | A1 |   | 4/2005 | Samadani et al. |
| 2005/0094893 | A1 |   | 5/2005 | Samadani |

* cited by examiner

*Primary Examiner*—Gims S Philippe (57) ABSTRACT

Method and devices for enhancing still digital images extracted from a compressed video sequences are disclosed herein, wherein the compressed video sequence comprises at least one I-frame and at least one P-frame. The method comprises determining whether an I-frame or a P-frame of video has been extracted, determining the quantization matrix of the previous I-frame if a P-frame has been extracted, and reconstructing the extracted video frame. The image is enhanced based on the quantization matrix of the present I-frame if the extracted frame is an I-frame and based on the quantization matrix of the previous I-frame if a P-frame has been extracted.

23 Claims, 5 Drawing Sheets

METHOD OF ENHANCING IMAGES EXTRACTED FROM VIDEO

BACKGROUND

Digital video, in summary, comprises a plurality of digital images or video frames. Due to the large amount of data generated by digital video, compression is often performed. MPEG video compression is a popular technique. In MPEG, each video sequence is divided into one or more groups of pictures (GOP). Furthermore, each GOP is composed of one or more frames of three different types: I-frames, P-frames, and B-frames. I-frames (intra-coded frames) are coded or otherwise compressed independently, i.e. without reference to other frames. P-frames are compressed by coding the difference between the current frame and a temporally preceding I-frame or P-frame. B-frames do not have bearing on the methods or devices described herein.

In general, lossy video compression methods, such as MPEG, introduce artifacts into the individual video frames. In some applications, it may be desirable to extract a single frame from the video sequence, enhance its quality, and save this single frame as an independent image. However, the artifacts introduced by these lossy compression methods can significantly reduce the image quality.

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

I. Digital Video

Digital video, in summary, comprises a plurality of digital images or video frames. Due to the large amount of data generated by digital video, compression is often performed. MPEG video compression is a popular technique. In MPEG, each video sequence is divided into one or more groups of pictures (GOP). Furthermore, each GOP is composed of one or more frames of three different types: I-frames; P-frames, and B-frames. I-frames (intra-coded frames) are coded or otherwise compressed independently, i.e. without reference to other frames. P-frames are compressed by coding the difference between the current frame and a temporally preceding I-frame or P-frame. B-frames do not have bearing on the methods or devices described herein.

The discrete cosine transform (DCT) is used for coding both I-frames and P-frames. The DCT is a method of decomposing a block of data into a weighted sum of spatial frequencies. Following the DCT, quantization is used to compress the DCT coefficients and also control the bitrate. In MPEG the bitrate can be controlled by applying a linear scale factor to the default quantization matrices. A DCT coefficient is quantized by dividing it by a non-zero positive integer, which is referred to as a quantization value, and rounding the quotient to the nearest integer. For I-frames, it is desirable to represent the coefficients for high spatial frequecies with less precision. This may be achieved by using a larger quantization value, such as the quantization values shown by the quantization matrix of Table 1.

TABLE 1

Default MPEG I-frame 8 × 8 Quantization matrix $Qi[I, j]$ 8, 16, 19, 22, 26, 27, 29, 34,
16, 16, 22, 24, 27, 29, 34, 37,
19, 22, 26, 27, 29, 34, 34, 38,
22, 22, 26, 27, 29, 34, 37, 40,
22, 26, 27, 29, 32, 35, 40, 48,
26, 27, 29, 32, 35, 40, 48, 58,
26, 27, 29, 34, 38, 46, 56, 69,
27, 29, 35, 38, 46, 56, 69, 83

For P-frames, the quantization process operates on the difference between the current frame and a previously transmitted frame. This difference signal is usually largely decorrelated and therefore contains largely uniform frequency content. Therefore, a flat quantization matrix is used to compress this difference signal. An example of a quantization matrix used to compress P-frames is provided in Table 2.

TABLE 2

Default MPEG P-frame 8 × 8 Quantization matrix $Qp[I, j]$ 16, 16, 16, 16, 16, 16, 16, 16,
16, 16, 16, 16, 16, 16, 16, 16,
16, 16, 16, 16, 16, 16, 16, 16,
16, 16, 16, 16, 16, 16, 16, 16,
16, 16, 16, 16, 16, 16, 16, 16,
16, 16, 16, 16, 16, 16, 16, 16,
16, 16, 16, 16, 16, 16, 16, 16,
16, 16, 16, 16, 16, 16, 16, 16

In general, lossy video compression methods, such as MPEG, introduce artifacts into the individual video frames. In some applications, it may be desirable to extract a single frame from the video sequence, enhance its quality, and save this single frame as an independent image. Methods and devices are described herein which reduce the artifacts associated with extracting a still image from video.

II. Compressing a Video Frame

Figure 1:
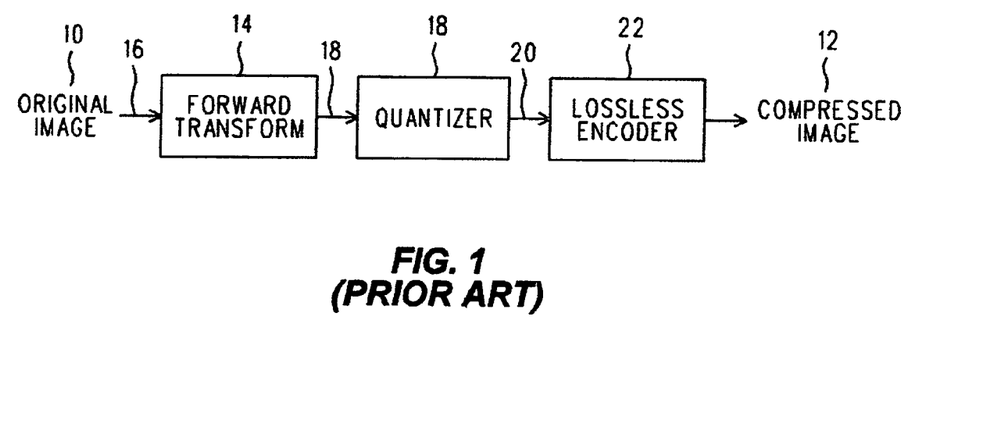
FIG. 1 is a block diagram of a system for compressing an original video frame.

FIG. 1 shows a prior art method of processing an original image, such as a video frame, 10 to produce a compressed image 12. In accordance with the illustrated method, a forward transform 14 is applied to the original image 10 to produce a set of forward transform coefficients 16. The forward transform 14 may be any type of transform that is operable to convert the original image 10 into a set of coefficients in a selected domain. A quantizer 18 is applied individually to the forward transform coefficients 16 to produce a set of quantized forward coefficients 20. The quantizer 18 discards some of forward transform coefficient information, enabling the original image 10 to be compressed. An encoder 22 encodes the quantized forward transform coefficients using any type of lossless coding technique to produce compressed image 12.

Original image 10 may be a binary image (e.g., a dark and bright dot pattern), a multilevel single-color image (e.g., a gray-level image), or a multilevel multi-color image. In general, the image compression process of FIG. 1 is applied individually to each color plane of each original video frame in the video sequence.

Figure 2:
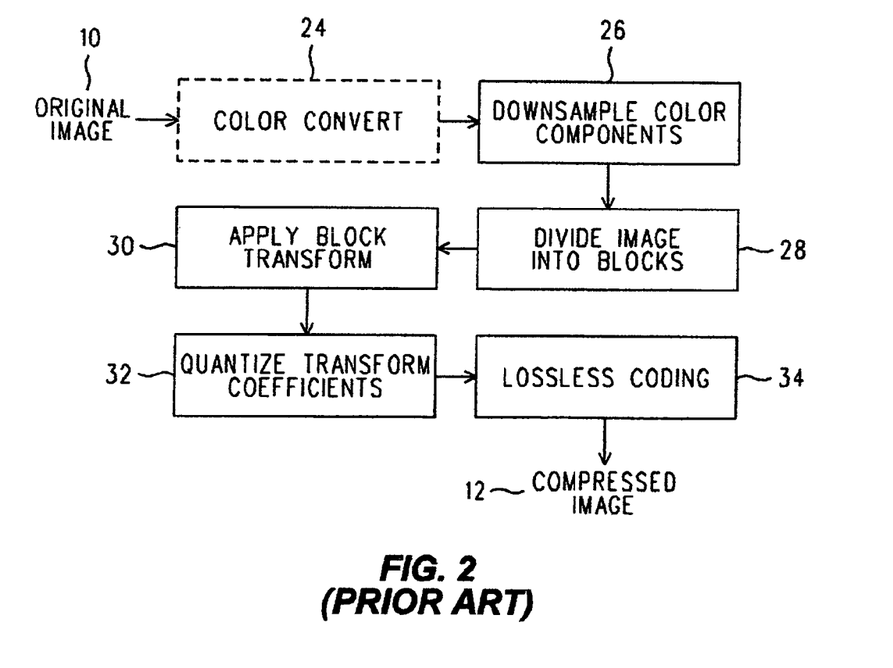
FIG. 2 is a flow diagram of a block-transform-based method of compressing an original video frame.

FIG. 2 shows a prior art block-transform-based image method of compressing original image 10. In accordance with this method, original image 10 initially is converted into a preselected luminance-based color space (e.g., the YCrCb color space), if the original image 10 is not already specified in the preselected color space (block 24). Each color plane of the image in the preselected color space corresponds to a respective image (i.e., an array of pixel values) that is processed individually as follows. The color components (e.g., the Cr and Cb color components) are downsampled (block 26). Each color plane is divided into blocks of pixels (e.g., 8×8 pixel blocks) (block 28). A block transform is applied to each pixel block individually (block 30). Any kind of block transform may be applied to the blocks. Exemplary types of block transforms include the cosine transform, Fourier transform, Hadamard transform, and wavelet transform. The resulting transform coefficients are quantized (block 32). The quantized transform coefficients are encoded using a lossless coding technique to produce compressed image 12 (block 34).

III. Selection of a Frame for Extraction

As set forth above, compressed digital video typically includes I-frames and P-frames. I-frames (intra-coded frames) are coded independently, which means they are coded without reference to other frames. I-frame compression in MPEG is very similar to JPEG compression as described above. On the other hand, P-frames are compressed by coding the difference between the current frame and a temporally preceding I-frame or P-frame.

Video compression implementations typically code several P-frames for every I-frame. For example, a single I-frame may be followed by ten P-frames in a particular GOP. The quantization tables associated with the I-frame in the GOP provides information for reducing artifacts in both I-frames and P-frames.

As described above, the I-frame quantization matrix determines the amount of compression and consequently the amount of distortion introduced in each DCT coefficient of the I-frame. Because frame quality is relatively uniform within each GOP, the quantization matrix of the I-frame in the GOP is used as an approximate quantization matrix for all reconstructed frames in the GOP (i.e. supposing that all the frames of the GOP were I-frames). The use of the quantization matrix of the I-frame enables JPEG enhancement techniques that require the input of the quantization matrix to be used for enhancing extracted video frames. As also described above, the quantization matrix used for coding the difference signal used to create P-frames is flat, and therefore does not provide as good of an indication of frame quality. The I-frame quantization matrix is therefore used.

Figure 3:
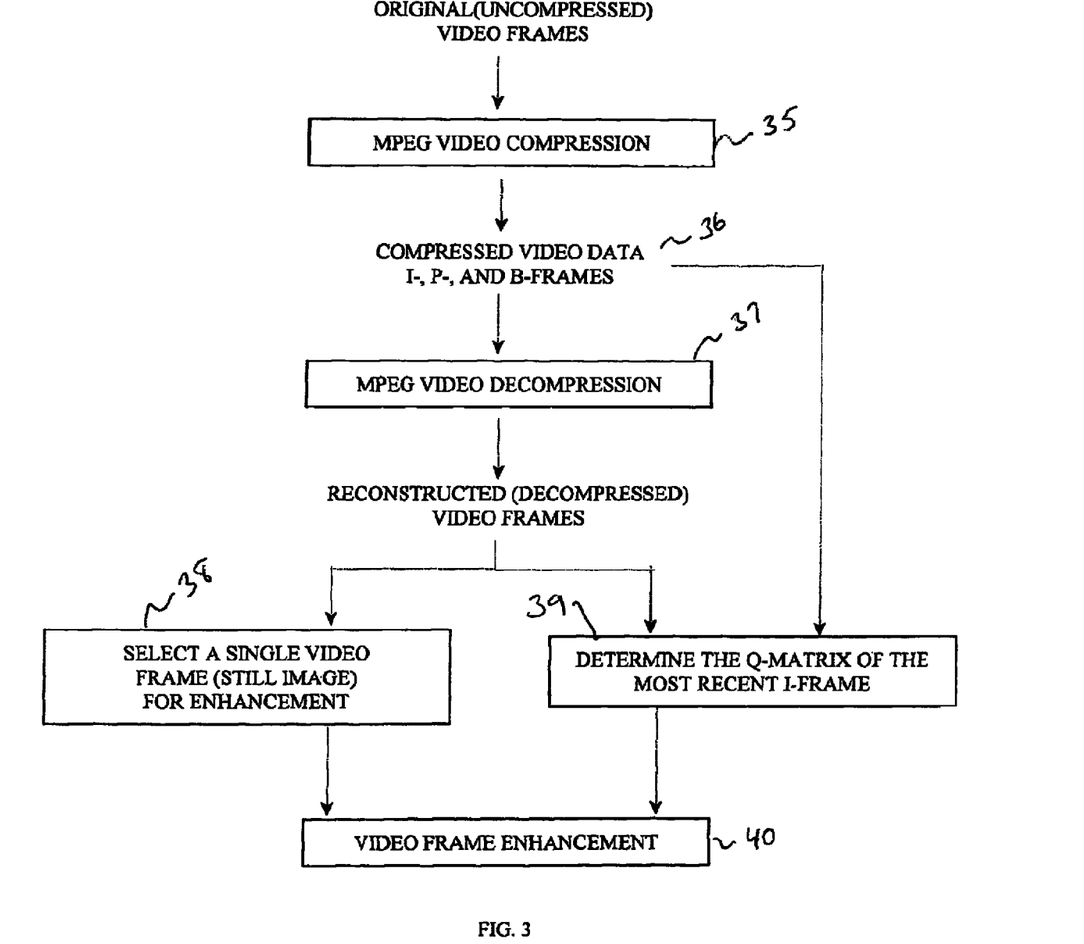
FIG. 3 is a flow diagram illustrating an embodiment of a method used to enhance a video frame.
Figure 4:
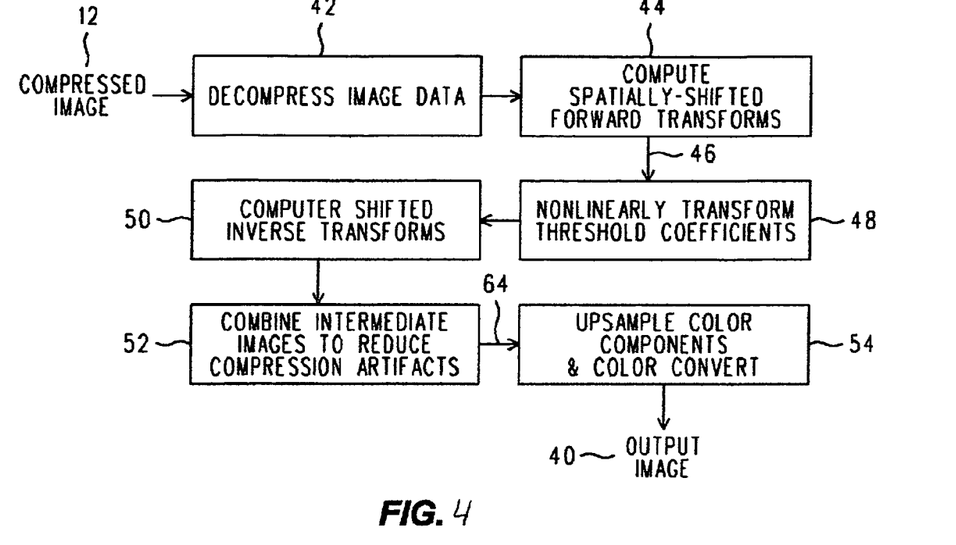
FIG. 4 is a flow diagram of an embodiment of a method of processing a compressed image to produce an output image characterized by reduced compression artifacts.

An embodiment of a method for enhancing video frames using the above-described I-frames and P-frames is shown in the flow diagram of FIG. 3. In block 35 uncompressed or original video is compressed. In the embodiments described herein, the video is compressed using MPEG video compression. The compressed video 36 includes I-frame, P-frames, and B-frames. At block 37, the compressed video is decompressed or reconstructed. This may occur upon a user selecting a video frame for extraction or enhancement as shown in block 38. At block 39, the quantization matrix or Q-matrix of the previous I-frame is determined. As noted above, if the selected frame is an I-frame, the quantization matrix of the I-frame is determined. Enhancement of the video frame using the quantization matrix of the previous or present I-frame occurs as shown in block 40. FIG. 4 and subsequent descriptions describe the enhancement in greater detail.

IV. Reducing Artifacts in Compressed Images

The embodiments described below are configured to reduce artifacts inherently introduced by processes that are used to create compressed images. In many instances, these embodiments reduce image compression artifacts without degrading image quality, such as by blurring features in the image. As described in detail below, some implementations of these embodiments are particularly well-suited to substantially reduce ringing and blocking compression artifacts that are introduced by block-transform-based image compression techniques, such as block discrete cosine transform (DCT) image compression techniques.

FIG. 4 shows an embodiment of a method of processing a compressed image 12 that is generated by the block-transform-based image compression method of FIG. 2 to produce an output image 40 with reduced compression artifacts. The compressed image may be either a P-frame or an I-frame. In this method, each plane of the compressed image 12 is processed individually. The compressed image data initially is decompressed (block 42).

Spatially-shifted forward transforms are computed from the decompressed image data 62 (block 44) of the video frame. In this process, a forward transform operation is applied to each of multiple shifted versions of the decompressed image data 62 to produce multiple respective sets of forward transform coefficients 46. For example, in an implementation in which the image 12 is compressed based on blocks of M×N pixels, the forward transform operation is applied to the decompressed image data 62 on a subset containing K shifts from the M×N independent shifts possible in an M×N transform to produce K sets of forward transform coefficients, where K, M, and N have integer values of at least 1. In one exemplary implementation, both M and N have a value of 8.

The forward transform coefficients 46 of each set are non-linearly transformed (block 48). An inverse transform operation (block 50) is applied to the sets of nonlinearly transformed forward transform coefficients 46 to produce respective intermediate images. As explained in detail below, the intermediate images are combined to reduce compression artifacts in each color plane 64 (block 52). The color component image planes (e.g., Cr and Cb) are upsampled to the original resolution and the resulting image planes are converted back to the color space (e.g., the red-green-blue color space) of the original image 10 (block 54). The image planes are combined to produce the output image 40.

Figure 5:
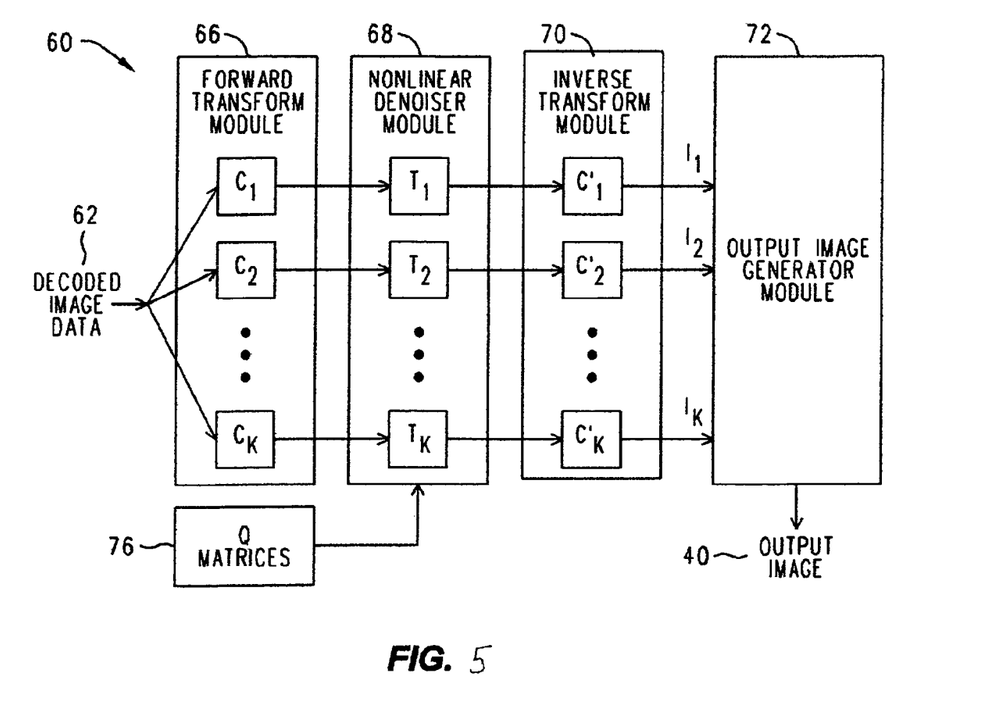
FIG. 5 is a block diagram of an embodiment of an image processing system for implementing output image generator steps in the method of FIG. 4.

FIG. 5 shows an embodiment of a system 60 for processing the decompressed image data 62 generated by the method of FIG. 4 to produce the compression-artifact-reduced output image 40. Processing system 60 includes a forward transform module 66, a nonlinear denoiser module 68, an inverse transform module 70, and an output image generator module 72. In general, the modules 66-72 of system 60 are not limited to any particular hardware or software configuration, but rather they may be implemented in any computing or processing environment, including in digital electronic circuitry or in computer hardware, firmware, device driver, or software. For example, in some implementations, these modules 66-72 may be embedded in the hardware of any one of a wide variety of electronic devices, including digital cameras, printers, and portable electronic devices (e.g., mobile phones and personal digital assistants). In addition, although full (or complete) input images are processed in the illustrated embodiments, other embodiments may be configured to sequentially process a series of sub-image portions (e.g., swaths) of an input image.

The forward transform module 66 computes K sets ($C_1$, $C_2$ ..., $C_k$) of shifted forward transform coefficients from the decoded image data 62. The K sets of shifted transform coefficients correspond to K unique positions of a blocking grid relative to the compressed image 12.

Figure 6:
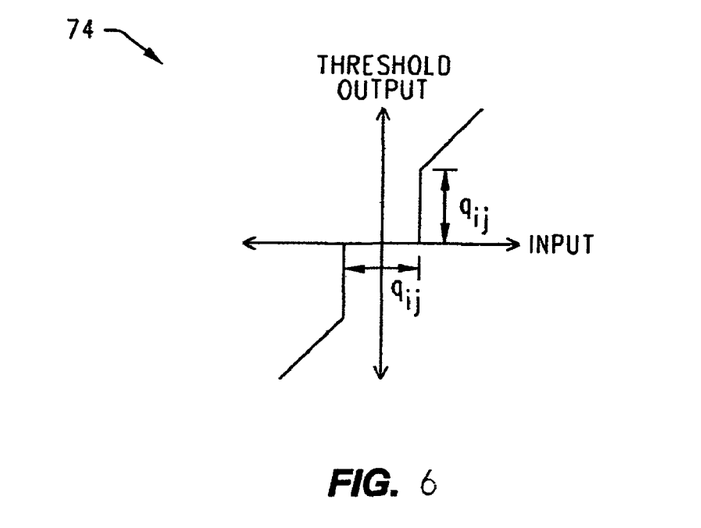
FIG. 6 is a graph of threshold output in an implementation of the nonlinear denoiser module of FIG. 5 plotted as a function of input transform coefficient values.

The nonlinear denoiser module 68 nonlinearly transforms the sets ($C_1$, $C_2$ ..., $C_k$) of shifted forward transform coefficients that are computed by the forward transform module 66. Referring to FIG. 6, in some implementations, the sets of forward transform coefficients are transformed in accordance with respective nonlinear thresholding transformations ($T_1$, $T_2$ ..., $T_k$). In particular, the forward transform coefficients are nonlinearly transformed by setting each coefficient to zero that has an absolute value below a respective threshold ($q_{ij}$, where i, j refer to the indices of the quantization element, with i having values in the range of 0 to M-1 and j having values in the range of 0 to N-1) and leaving unchanged each coefficient with an absolute value equal to or above a respective threshold ($q_{ij}$). Quantization matrices 76 (or "Q Matrices") are used to set the parameters $q_{ij}$ for the nonlinear thresholding transformations ($T_1$, $T_2$ ..., $T_k$). In this implementations, the quantization matrix contains the same quantization parameters $q_{ij}$ that were originally used to compress image 12 of the I-frame or the previous I-frame of the GOP in situations where P-frames were selected. These quantization parameters may be stored in the compressed image 12 in accordance with standard image and video compression schemes, such as JPEG and MPEG.

In some embodiments, the nonlinear denoiser module 68 incorporates sharpness enhancements by modifying the non-linearities, Ti. In particular, nonlinear denoiser module 68 multiplies the nonlinear transform parameter values $q_{ij}$ by gain factors $g_{ij}$. There are many ways to set the gain factors. In one implementation, the gain factors are given by equation (1):

$$g_{ij} = 1.0 + s*(i+j)/14 \quad (1)$$

where i and j are the indices selecting each quantizer coefficient. In implementations designed for 8×8 blocking grids, the values of i and j are in the range [0-7], with 0 representing the lowest spatial frequency, and 7 representing the highest spatial frequency. The value of sharpness factor, s, determines the amount of sharpening. When s=0, no sharpening is applied. Values of s between 0.5 and 1.5 provide an adequate sharpness range to compensate for slight blurring that might be caused by the output image generator methods. A matrix containing exemplary gain factors computed from equation (1) for s=0.5 is provided in Table 3, below:

TABLE 3

| Gain Factors $g_{ij}$ for s = 0.5 |
| --- |
| 1.0000 1.0357 1.0714 1.1071 1.1429 1.1786 1.2143 1.2500 |
| 1.0357 1.0714 1.1071 1.1429 1.1786 1.2143 1.2500 1.2857 |
| 1.0714 1.1071 1.1429 1.1786 1.2143 1.2500 1.2857 1.3214 |
| 1.1071 1.1429 1.1786 1.2143 1.2500 1.2857 1.3214 1.3571 |
| 1.1429 1.1786 1.2143 1.2500 1.2857 1.3214 1.3571 1.3929 |
| 1.1786 1.2143 1.2500 1.2857 1.3214 1.3571 1.3929 1.4286 |
| 1.2143 1.2500 1.2857 1.3214 1.3571 1.3929 1.4286 1.4643 |
| 1.2500 1.2857 1.3214 1.3571 1.3929 1.4286 1.4643 1.5000 |

The inverse transform module 70 computes sets ($C'_1$, $C'_2$, ... $C'_k$) of inverse transforms from the sets of nonlinearly transformed forward transform coefficients. The inverse transform module 70 applies the inverse of the forward transform operation that is applied by forward transform module 66. The outputs of the inverse transform module 70 are intermediate images ($I_1$, $I_2$, ..., $I_k$) representing the image data in the spatial domain.

Figure 7:
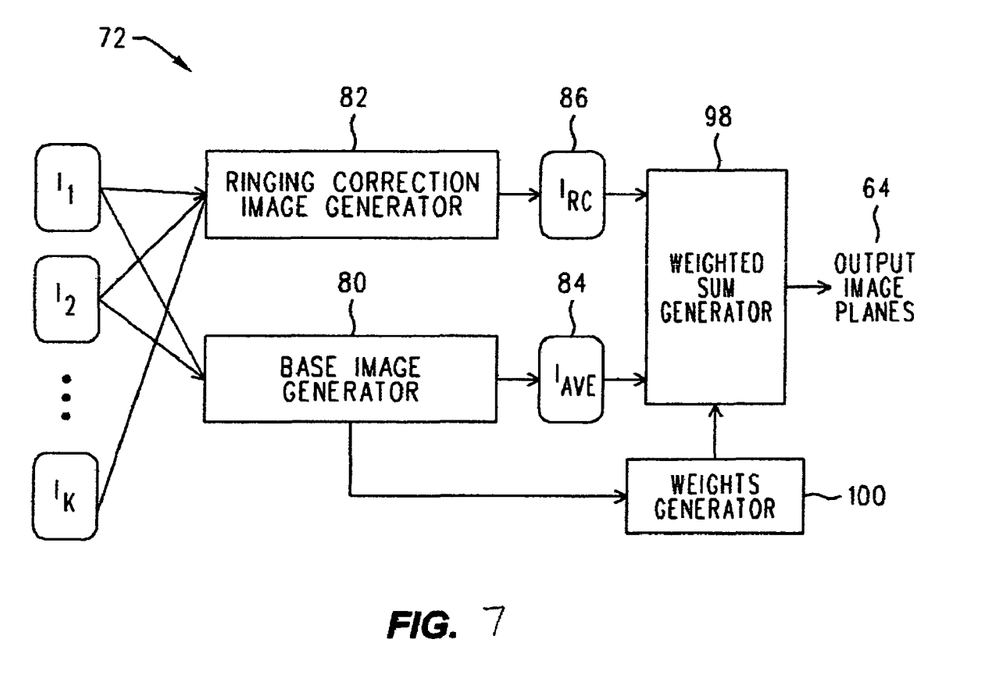
FIG. 7 is a block diagram of an implementation of the output image generator module in of FIG. 5.
Figure 8:
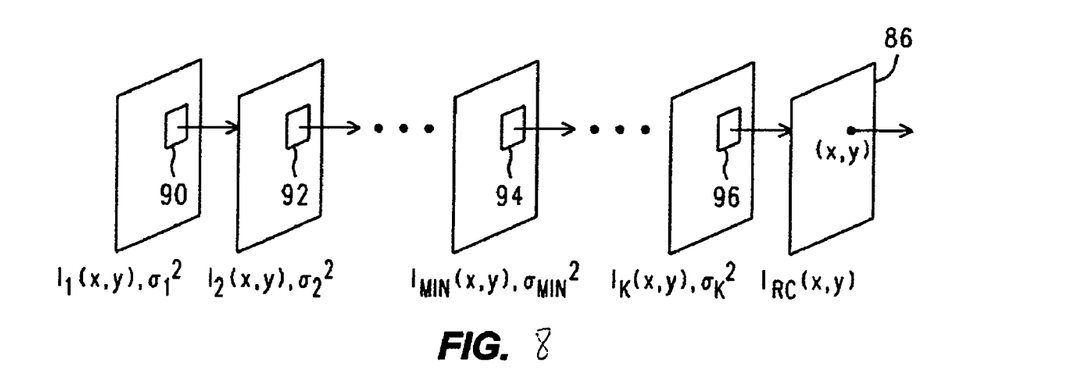
FIG. 8 is a diagrammatic view of a set of intermediate images and a ringing correction image generated from the set of intermediate images.

The output image generator module 72 combines the intermediate images ($I_1$, $I_2$, ..., $I_k$) to form the image planes 64 of the final output image 40. FIG. 7 shows an embodiment of the output image generator module 72 that includes a base image generator 80 and a ringing correction image generator 82.

The base image generator 80 computes a base image 84 corresponding to an estimate of the original uncompressed image from a combination of the intermediate images ($I_1$, $I_2$, ..., $I_k$). In the illustrated embodiment, the base image generator 80 computes a base image ($I_{AVE}$) that has pixel values corresponding to averages of corresponding pixels in the intermediate images ($I_1$, $I_2$, ..., $I_k$).

The ringing correction image generator 82 computes a ringing correction image ($I_{RC}$) based on the intermediate images ($I_1$, $I_2$, ..., $I_k$). In some implementations, the ringing correction image generator 82 computes a ringing correction image 86 ($I_{RC}$) based at least in part on measures of local spatial intensity variability that are computed for pixels of the intermediate images ($I_1$, $I_2$, ..., $I_k$). For example, in a minimum variance de-ringing implementation, the value of a given pixel of the ringing correction image 86 is set to the value of the corresponding inter mediate image pixel having the lowest computed measure spatial intensity variability of all the intermediate image pixels corresponding to the pixel in the ringing correction image 86. In a weighted variance de-ringing approach, each pixel value of the ringing correction image 86 is assigned a value corresponding to an average of multiple corresponding intermediate image in a lowest percentile (e.g., the 30% percentile) of local spatial variability measures of all the intermediate image pixels corresponding to the given pixel in the ringing correction image 86. The weighted variance de-ringing approach has been observed to reduce ringing compression artifacts while avoiding noise that sometimes is introduced by the minimum variance de-ringing approach.

Referring to FIG. 7, in some embodiments, spatial intensity variability is measured by the spatial variance ($\sigma_1^2$, $\sigma_2^2$, ..., $\sigma_k^2$), which is computed for pixels of the intermediate images ($I_1(x,y)$, $I_2(x,y)$, ..., $I_k(x,y)$) corresponding to a given pixel $I_{RC}(x,y)$ in the ringing correction image 86. The spatial variance measures are computed based on respective intermediate image regions defined by respective windows 90, 92, 94, 96. In the illustrated embodiment, the windows 90-96 have dimensions of 3 pixels in width by 3 pixels in height. In one exemplary implementation, the spatial variance for a given intermediate image pixel $I_j(x,y)$ is given by equation (2):

$$\sigma_0^2 = \frac{1}{K} \cdot \sum_{j=1}^{K} (V_j - \langle V \rangle)^2 \quad (2)$$

where $\langle V \rangle$ is the average pixel value in the neighborhood of the given pixel $$\left(\text{i.e., } \langle V \rangle = \frac{1}{K} \sum_{j=1}^{K} V_i\right)$$

and K is the number (e.g., nine) of pixels in the neighborhood of the given pixel in the ringing correction image 86. In another exemplary implementation, the spatial variability, $\Lambda_0^2$, for a given intermediate image pixel $I_j(x,y)$ with a value $V_0$ is given by equation (3):

$$\Lambda_0^2 = \frac{1}{K} \cdot \sum_{j=1}^{K} (V_j - V_0)^2 \quad (3)$$

In the illustrated embodiment, the value of the intermediate image pixel (e.g., $I_{MIN}(x,y)$) with the smallest computed variance ($\sigma_{MIN}^2$) is assigned to the corresponding pixel ($I_{RC}(x,y)$) in the ringing correction image 86.

It has been observed that the base image 84 is characterized by a substantial reduction in the appearance of compression artifacts, such as blocking artifacts, but in some cases the base image 84 still contains residual ringing artifacts. It also has been observed that the ringing correction image 86 ($I_{RC}$) is characterized by substantially reduced ringing compression artifacts relative to the base image 84, but otherwise is generally more blurry than the base image 84. Based on these observations, the output image generator module 72 is configured to combine the base image 84 and the ringing correction image 86 in ways that substantially reduce the appearance of compression artifacts in the resulting output image 40.

In the embodiment of FIG. 7, the output image generator module 72 includes a weighted sum generator 98 that computes weighted sums of corresponding pixels of the base image 84 ($I_{AVE}(x,y)$) and the ringing correction image 86 ($I_{RC}(x,y)$) to generate the values of the pixels of the output image 40 in accordance with equation (4):

$$I_{OUT}(x,y) = \alpha(x,y) I_{RC}(x,y) + (1 - \alpha(x,y)) I_{AVE}(x,y) \quad (4)$$

where $\alpha$ has a value in the range [0,1].

A weights generator module 100 computes the values of $\alpha(x,y)$ for each pixel of the output image 40. In general, for pixels that are sufficiently far from sharp transitions, where the expected ringing is minimal, the weights generator module 100 sets $\alpha(x,y) \approx 0$. For pixels on a sharp transition, the weights generator module 100 also sets $\alpha(x,y) \approx 0$ in order to not blur the transition. For pixels that are sufficiently close to (e.g., adjacent to) but not on a sharp transition, the weights generator module 100 sets $\alpha(x,y) \approx 1$ to reduce the potential ringing.

Figure 9:
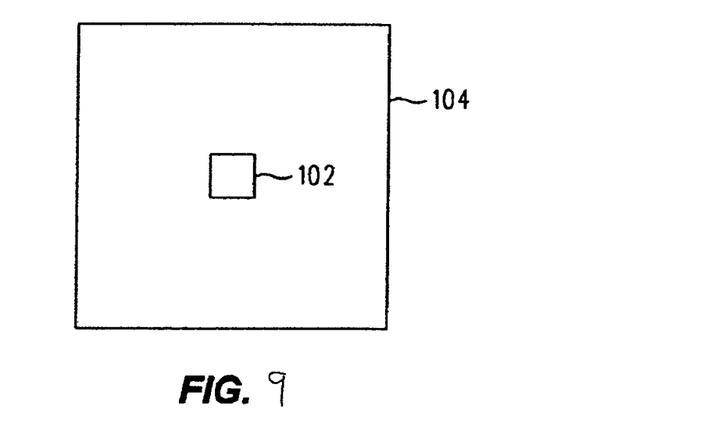
FIG. 9 is a block diagram of a pair of concentric windows used to compute a measure of block contrast and a measure of local contrast from pixel values of a base image.

In some embodiments, the weights generator module 100 computes $\alpha(x,y)$ for a given pixel based on a measure of relative contrast between a local region in a spatial window encompassing the given pixel and a larger region in a spatial window surrounding the local region. In some implementations, image contrast is computed from the pixel range, which is the difference, in a spatial window, between maximum and minimum pixel values. As shown in FIG. 9, in these implementations, the pixel range is calculated for windows 102, 104 of two different sizes. The size of the first window 102 is small (e.g., 3 pixels by 3 pixels) in order to accurately estimate local contrast near edges. In some implementations, the size of the second window 104 (e.g., 15 pixels by 15 pixels) covers all of the shifted block transforms at a given pixel. The pixel range calculations result in a local contrast measure, lc, and a block contrast measure, bc.

Figure 10:
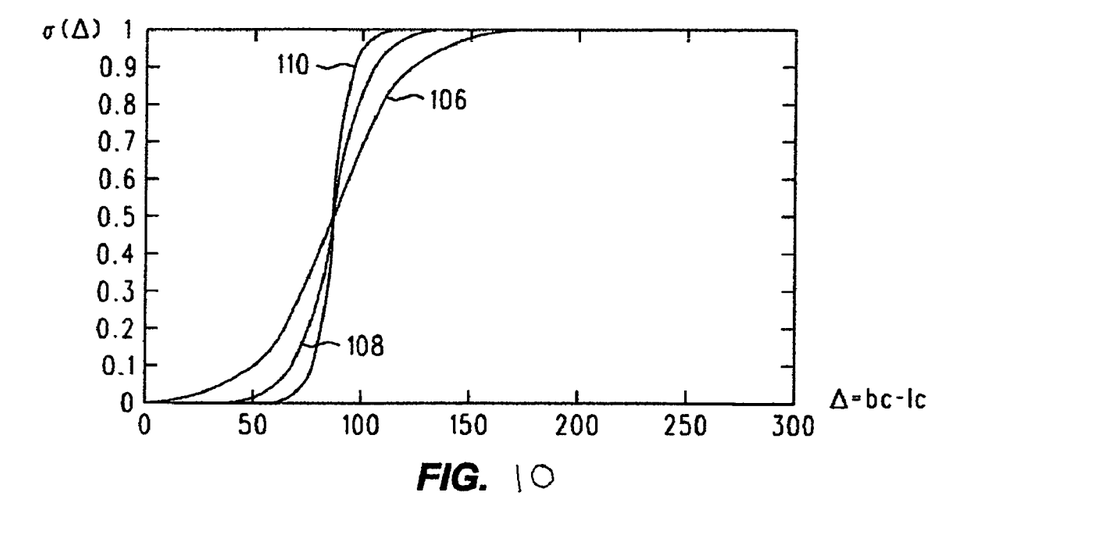
FIG. 10 are graphs of weighting values plotted as functions of contrast difference between measures of block contrast and local contrast computed for a pixel of a base image.

The weights generator module 100 inputs the difference ($\Delta$) between the local and block contrast measures (i.e., $\Delta(x,y) = bc(x,y) - lc(x,y)$) into a function $\alpha(\Delta)$, which may be stored as a lookup table, to generate a value of $\alpha(\Delta)$ in the range [0,1]. Three different weighting functions 106, 108, 110 are shown in FIG. 10. These functions correspond to the general function given by equation (5):

$$\alpha(\Delta) = \frac{1}{1 + e^{\frac{-(\Delta - T)}{a}}} \quad (5)$$

where a and T are variable parameters. A final lookup table for $\alpha(\Delta)$, which was trained with test images using subjective evaluations and objective PSNR (Peak Signal-To-Noise Ratio) values, is provided in Table 4 below. This table is presented in "reading order" (i.e., left to right, top to bottom):

TABLE 4

Weights Lookup 0.000045, 0.000051, 0.000057, 0.000065, 0.000073, 0.000082, 0.000092,
0.000103, 0.000116, 0.000130, 0.000147, 0.000165, 0.000185, 0.000208,
0.000234, 0.000263, 0.000296, 0.000333, 0.000374, 0.000421, 0.000473,
0.000532, 0.000598, 0.000672, 0.000755, 0.000849, 0.000955, 0.001073,
0.001207, 0.001356, 0.001525, 0.001714, 0.001927, 0.002166, 0.002434,
0.002736, 0.003075, 0.003456, 0.003884, 0.004365, 0.004905, 0.005512,
0.006193, 0.006958, 0.007816, 0.008779, 0.009860, 0.011072, 0.012432,
0.013956, 0.015664, 0.017577, 0.019719, 0.022117, 0.024798, 0.027796,
0.031144, 0.034881, 0.039048, 0.043691, 0.048858, 0.054601, 0.060975,
0.068040, 0.075858, 0.084493, 0.094010, 0.104477, 0.115961, 0.128525,
0.142232, 0.157137, 0.173288, 0.190724, 0.209470, 0.229535, 0.250913,
0.273574, 0.297470, 0.322526, 0.348645, 0.375706, 0.403567, 0.432063,
0.461017, 0.490236, 0.519521, 0.548673, 0.577495, 0.60S799, 0.633410,
0.660172, 0.685949, 0.710628, 0.734120, 0.756358, 0.777300, 0.796925,
0.815232, 0.832237, 0.847968, 0.862468, 0.875787, 0.887984, 0.899121,
0.909265, 0.918480, 0.926835, 0.934395, 0.941223, 0.947381, 0.952926,
0.957912, 0.962391, 0.966410, 0.970013, 0.973241, 0.976129, 0.978713,
0.981022, 0.983085, 0.984927, 0.986572, 0.988039, 0.989347, 0.990514,
0.991554, 0.992481, 0.993307, 0.994043, 0.994698, 0.995282, 0.995801,
0.996264, 0.996676, 0.997042, 0.997368, 0.997659, 0.997917, 0.998147,
0.998352, 0.998534, 0.998695, 0.998840, 0.998968, 0.999082, 0.999183,
0.999274, 0.999354, 0.999425, 0.999489, 0.999545, 0.999596, 0.999640,
0.999680, 0.999715, 0.999747, 0.999775, 0.999800, 0.999822, 0.999842,
0.999859, 0.999875, 0.999889, 0.999901, 0.999912, 0.999922, 0.999930,
0.999938, 0.999945, 0.999951, 0.999956, 0.999961, 0.999965, 0.999969,
0.999973, 0.999976, 0.999978, 0.999981, 0.999983, 0.999985, 0.999986,
0.999988, 0.999989, 0.999990, 0.999992, 0.999992, 0.999993, 0.999994,
0.999995, 0.999995, 0.999996, 0.999996, 0.999997, 0.999997, 0.999997,
0.999998, 0.999998, 0.999998, 0.999998, 0.999999, 0.999999, 0.999999,
0.999999, 0.999999, 0.999999, 0.999999, 0.999999, 0.999999, 0.999999,
1.000000, 1.000000, 1.000000, 1.000000, 1.000000, 1.000000, 1.000000,
1.000000, 1.000000, 1.000000, 1.000000, 1.000000, 1.000000, 1.000000,
1.000000, 1.000000, 1.000000, 1.000000, 1.000000, 1.000000, 1.000000,
1.000000, 1.000000, 1.000000, 1.000000, 1.000000, 1.000000, 1.000000,
1.000000, 1.000000, 1.000000, 1.000000, 1.000000, 1.000000, 1.000000,
1.000000, 1.000000, 1.000000, 1.000000, 1.000000, 1.000000, 1.000000,
1.000000, 1.000000, 1.000000, 1.000000, 1.000000, 1.000000, 1.000000,
1.000000, 1.000000, 1.000000, 1.000000

Other embodiments are within the scope of the claims.

For example, although the above compression artifact reduction embodiments are described in connection with an image 12 that is compressed by a block-transform-based image compression method, these embodiments readily may be used to reduce artifacts in images compressed by other non-block transform-based image compression techniques.

What is claimed is:

1. A method of enhancing a still digital image extracted from a compressed video sequence, said compressed video sequence comprising at least one I-frame and at least one P-frame, said method comprising:
   determining whether an I-frame or a P-frame of video has been extracted;
   determining the quantization matrix of the previous I-frame if a P-frame has been extracted;
   reconstructing the extracted video frame
   enhancing the image based on the quantization matrix of the present I-frame if the extracted frame is an I-frame and enhancing the image based on the quantization matrix of the previous I-frame if a P-frame has been extracted.

2. The method of claim 1, wherein the enhancing further comprises:
   computing spatially-shifted forward transforms on the reconstructed video frame to generate respective sets of forward transform coefficients;
   applying nonlinear transforms to the forward transform coefficients of each set;
   computing inverse transforms of the sets of nonlinearly transformed forward transform coefficients to generate respective intermediate images;
   computing an output image with pixel values based at least in part on the intermediate images.

3. The method of claim 2, wherein the computed spatially-shifted forward transforms are block transforms.

4. The method of claim 3, wherein the block transforms are two-dimensional block discrete cosine transforms.

5. The method of claim 2, wherein the forward transform coefficients are nonlinearly transformed by setting to zero each coefficient with an absolute value less than a first value and leaving unchanged each coefficient with an absolute equal to at least a second value.

6. The method of claim 5, further comprising sharpening the forward transform coefficients by increasing nonlinear transform parameters by respective factors that are greater for higher spatial frequency forward transform coefficients than for lower spatial frequency forward transform coefficients.

7. The method of claim 2, wherein computing the output image comprises computing a base image from a combination of intermediate images.

8. The method of claim 7, wherein the base image has pixel values corresponding to respective averages of values of corresponding pixels in the intermediate images.

9. The method of claim 7, wherein computing the output image further comprises computing a ringing correction image based at least in part on the computed measures of local spatial intensity variability.

10. The method of claim 9, wherein each pixel in the ringing correction image is associated with a corresponding pixel in each of the intermediate images.

11. The method of claim 10, further comprising assigning to each pixel in the ringing correction image a value of a corresponding intermediate image pixel having a lowest computed measure of local spatial intensity variability of the corresponding intermediate image pixels.

12. The method of claim 10, further comprising assigning to each pixel in the ringing correction image a value corresponding to an average of multiple corresponding intermediate image pixels in a lowest percentile of local spatial variability measures of the corresponding intermediate image pixels.

13. The method of claim 9, wherein the output image is computed by combining pixel values from the base image and the ringing correction image.

14. The method of claim 13, wherein the output image is computed by a weighted combination of the base image and the ringing correction image.

15. The method of claim 14, further comprising identifying transition regions in the base image.

16. The method of claim 15, wherein identifying transition regions in the base image comprises, for a given pixel in the base image, computing a measure of local contrast for a local region encompassing the given pixel and computing a measure of block contrast for a larger region of the base image encompassing the local region.

17. The method of claim 16, wherein the measures of local contrast and block contrast correspond to pixel ranges computed based on two concentric windows superimposed over pixels of the base image.

18. The method of claim 16, further comprising mapping the measures of local contrast and block contrast to weights corresponding to respective pixel contributions of the base image and the ringing correction image to pixels of the output image.

19. The method of claim 18, wherein the base image weight is $1-\alpha$, the ringing correction image weight is $\alpha$, and $\alpha$ has a value ranging from 0 to 1 that is larger for pixels with relatively high ratios of block contrast to local contrast and is smaller for pixels with relatively low ratios of block contrast to local contrast.

20. The method of claim 19, wherein $$\alpha(\Delta) = \frac{1}{1 + e^{\frac{-(\Delta-T)}{a}}}$$

wherein $\Delta$=block contrast—local contrast, and $a$ and $T$ are variable parameters.

21. The method of claim 14, wherein the base image contribution to the output image is greater than the ringing correction image contribution for pixels remote from transition regions in the base image.

22. The method of claim 14, wherein the base image contribution to the output image is greater than the ringing correction image contribution for pixels in transition regions in the base image.

23. The method of claim 14, wherein the base image contribution to the output image is less than the ringing correction image contribution for pixels adjacent to transition regions in the base image.

* * * * *

UNITED STATES PATENT AND TRADEMARK OFFICE
CERTIFICATE OF CORRECTION

PATENT NO. : 7,760,805 B2
APPLICATION NO. : 11/142084
DATED : July 20, 2010
INVENTOR(S) : James Owens It is certified that error appears in the above-identified patent and that said Letters Patent is hereby corrected as shown below:

In column 10, line 48, in Claim 20, delete "contrast—local" and insert -- contrast-local --, therefor.

Signed and Sealed this

Ninth Day of November, 2010

David J. Kappos
*Director of the United States Patent and Trademark Office*